(12) United States Patent
Sankar et al.

(10) Patent No.: US 6,854,113 B1
(45) Date of Patent: Feb. 8, 2005

(54) MIXED-MODE EXECUTION FOR OBJECT-ORIENTED PROGRAMMING LANGUAGES

(75) Inventors: Sriram Sankar, Fremont, CA (US); Sreenivasa Viswanadha, Fremont, CA (US); Jose H Solorzano, Fremont, CA (US); Robert J Duncan, San Francisco, CA (US); Darius J Bacon, Fremont, CA (US)

(73) Assignee: Borland Software Corporation, Scotts Valley, CA (US)

( * ) Notice: Subject to any disclaimer, the term of this patent is extended or adjusted under 35 U.S.C. 154(b) by 0 days.

(21) Appl. No.: 09/384,963

(22) Filed: Aug. 27, 1999

Related U.S. Application Data (60) Provisional application No. 60/098,315, filed on Aug. 28, 1998.

(51) Int. Cl.[7] .................................................. G06F 9/54
(52) U.S. Cl. ............................ 718/1; 717/139; 717/140
(58) Field of Search ............................ 718/1; 717/139, 717/140, 146, 148, 162; 709/1

(56) References Cited

U.S. PATENT DOCUMENTS 5,999,732 A * 12/1999 Bak et al. .................... 717/148

OTHER PUBLICATIONS

Michael Weiss et. al, "TurboJ, a Java Bytecode–to–Native Compiler," Jan. 1998, p. 114–125.*
Gilers Muller et. al, "Harissa: a Flexible and Efficient Java Environment Mixing Bytecode and Compiled Code," Jun. 1997.*
David Griswold, "The Java HotSpot Virtual Machine Architecture," Mar. 1998.*

* cited by examiner

Primary Examiner—Meng-Al T. An
Assistant Examiner—Li Zhen
(74) Attorney, Agent, or Firm—MacCord Mason PLLC (57) ABSTRACT

A method for mixed-mode execution in object-oriented programs is disclosed whereby certain portions of source code can be executed by a higher-level mode of execution having access to the program at its highest level of abstraction, while other portions can be executed by a lower-level mode of execution. The invention described can be applied to any object-oriented environment where the higher-level mode of execution has components that are executed by the lower-level mode of execution and where new objects can be added to a running program at the lower-level mode of execution. In a presently preferred embodiment of the present invention, a source code interpreter operates directly on portions of Java source code where detailed information about the program is required (such as debugging information, profiling information or coverage information) while a virtual machine executes compiled byte code at all other times. Interactions between the source code interpreter and the virtual machine are also described in accessing/updating of memory in the virtual machine by the source code interpreter, and transfer of control between the source code interpreter and the virtual machine.

31 Claims, 10 Drawing Sheets

MIXED-MODE EXECUTION FOR OBJECT-ORIENTED PROGRAMMING LANGUAGES

RELATED APPLICATION

The present application claims priority from U.S. Provisional Application Ser. No. 60/098,315 filed Aug. 28, 1998 and entitled "Mixed-Mode Execution for Object-Oriented Programming Languages," which is incorporated herein by reference in its entirety for all purposes.

BACKGROUND OF THE INVENTION

(1) Field of the Invention

The present invention is related to the field of object-oriented programming languages, more specifically, the present invention is related to mixed-mode execution for object-oriented programming languages in ways such that a higher-level mode of execution and a lower-level mode of execution can be used together.

(2) Background

Traditionally, to execute programs using an interpreted object-oriented programming language such as Java or Smalltalk, the programmer writes source code. The source code is then processed by a compiler to produce byte code. Byte code is a low-level representation of the program optimized for efficient interpretation. The program is then interpreted by feeding the byte code to a virtual machine that understands the instructions within the byte code and executes them accordingly.

An alternate strategy to having a virtual machine execute the byte code instructions is to have a source code interpreter that directly operates on the source code. There are several advantages of using this strategy. For one, the source code interpreter has access to the program at its highest level of abstraction (as it was written by the programmer) and therefore it can extract the maximum possible information about the program and its execution. Further, the source code interpreter can execute partially written source code which in some cases, may not be translated into byte code by a compiler.

During the development of programs, it is important for the programmer to have access to various different kinds of information to facilitate maintaining and improving their programs. At the same time, it is important for the programmer to have the program run as quickly as possible.

It is therefore desirable, especially in environments such as Java, where the byte code and virtual machines are highly standardized, to use an alternate source code interpreter that provides more flexibility to implement features that are missing from the standardized byte code/virtual machines. Further, it is desirable to find ways in which a higher-level mode of execution such as a source code interpreter and a lower-level mode of execution such as a virtual machine executing byte code can be used together, such that the higher-level mode of execution executes source code for specific portions of the program whenever detailed information is desired, while the lower-level mode of execution is used at all other times.

BRIEF SUMMARY OF THE INVENTION

A method and an apparatus for using mixed-mode execution for object-oriented programming languages are disclosed. More specifically, the presently preferred embodiment of the present invention discusses ways in which a source code interpreter and a virtual machine executing byte code can be used together.

A source code interpreter that directly operates on the source code has access to the program at its highest level of abstraction and therefore can extract the maximum possible information about the program and its execution. The source code interpreter is also able to execute partially written source code, which may not be translated into byte code by a compiler. On the other hand, the virtual machine executing byte code runs faster than the source code interpreter.

In a presently preferred embodiment of the present invention, the source code interpreter executes source code for specific portions of the program whenever detailed information is desired, while the virtual machine executes byte code at all other times. Furthermore, in an infrastructure such as Java where the virtual machines are standardized and already available commonplace, the present invention describes how one can reuse many of the difficult to implement capabilities of the virtual machine during source code interpretation. Such reuse greatly simplifies the design and implementation of the source code interpreter itself. In the case of Java, important components of the virtual machine that can be reused include memory management (including garbage collection), thread scheduling, and thread synchronization.

Examples of information useful during development and that can be provided by this proposed infrastructure include debugging information (e.g. values of variables, information about method calling sequences, execution tracing), profiling information (e.g. time spent within a particular method, the amount of memory used, the number of objects allocated), coverage information that indicates how much of the program was executed and how comprehensively the program has been tested, and tracing information that can be used for things such as automatically replaying a previous execution of the program.

In a presently preferred embodiment of the present invention, four components interact with each other. The components include an independent source code instruction processor (SCIP), and three components of the virtual machine—the byte code instruction processor (BCIP), memory (M) and other modules (OM). The BCIP executes individual byte-code instructions that can cause changes to the M and/or cause the OM such as the thread scheduler or garbage collector to perform tasks. M is where all the state information of the virtual machine and the user program is stored. M is accessed/updated by the BCIP as well as the OM. The SCIP executes each individual source code statement directly. The SCIP uses the M in the virtual machine and the execution of the source code instructions can also cause changes to M.

In mixed-mode execution, the BCIP may from time to time decide to pass control to the SCIP (for example, when it realizes that profiling information needs to be gathered for a particular portion of code). Similarly, when the SCIP is executing, it may decide to transfer control back to the BCIP (for example, code that was being profiled has been executed and now execution can proceed at full speed).

The interaction between the SCIP and the virtual machine can therefore be categorized in three primary ways. One is access/update of the M in the virtual machine by the SCIP. Second is transferring control from the SCIP to the virtual machine. Third is transferring control from the virtual machine to the SCIP. The present invention discloses schemes to handle each of these interactions.

In general, a mechanism is described whereby new classes can be added to a running system allowing interactions between existing code and the newly added code in both directions. Also, part or all of the SCIP is written in the same language being interpreted—therefore this part of the SCIP is actually executed by the virtual machine.

While the presently preferred embodiment of the present invention considers mixed-mode execution between a source code interpreter and a virtual machine, the innovations described extend to any situation involving mixed-mode execution of object-oriented programs where the higher-level mode of execution (e.g. the SCIP) has some components that are being executed by the lower-level mode of execution (e.g. the virtual machine), and where it is possible to add new classes to a running program at the lower-level mode of execution (e.g. in all interpreted environments). Further, while certain exemplary embodiments have been described in detail and shown in the accompanying drawings, it is to be understood that such embodiments are merely illustrative of and not restrictive on the broad invention, and that this invention is not to be limited to the specific examples and constructions shown and described, since various other modifications may occur to those with ordinary skill in the art.

DETAILED DESCRIPTION OF THE INVENTION

A method and an apparatus for using mixed-mode execution for object-oriented programming languages are disclosed. More specifically, the presently preferred embodiment of the present invention discusses ways in which a source code interpreter and a virtual machine executing byte code can be used together.

Figure 1:
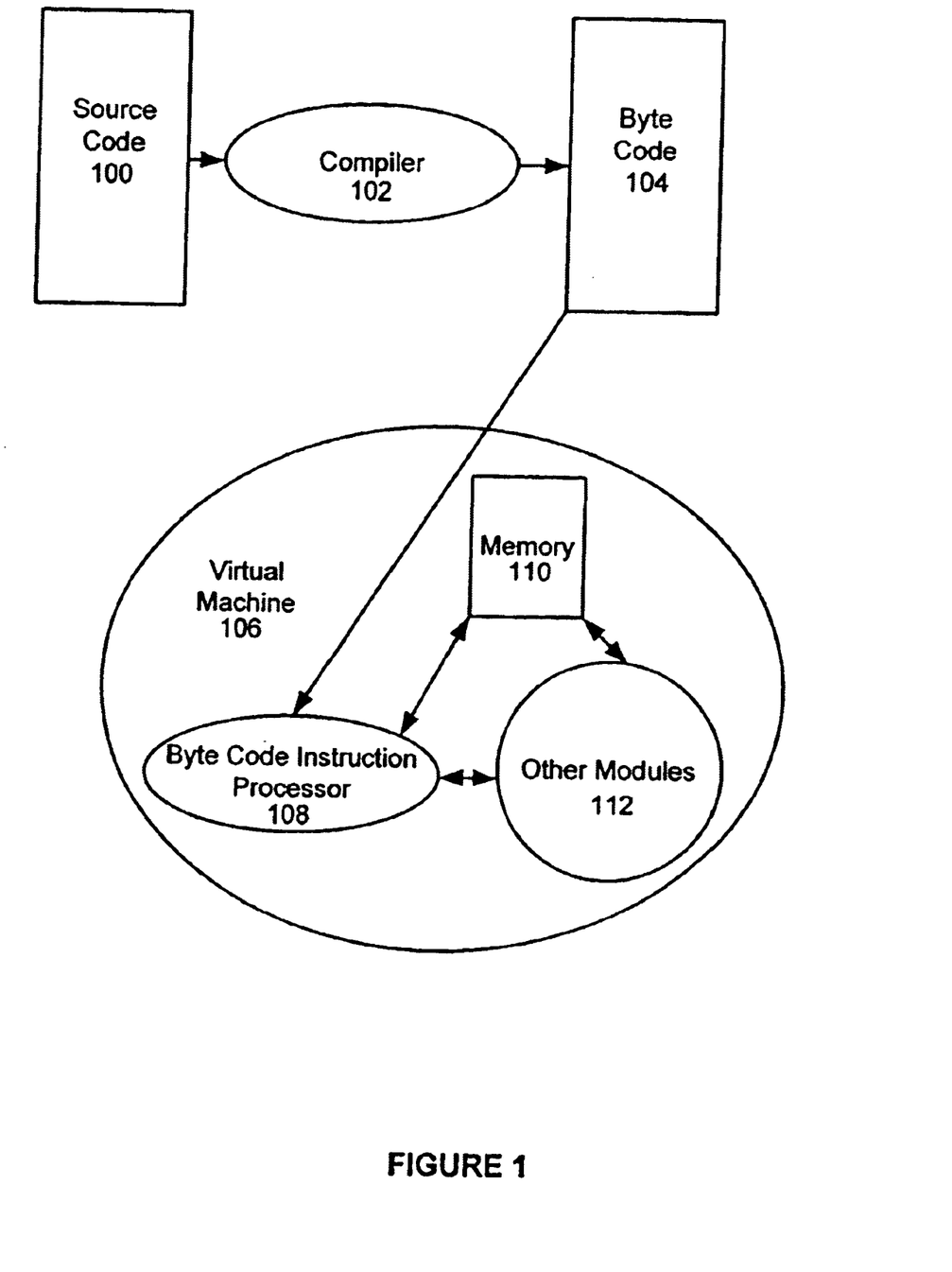
FIG. 1 illustrates the traditional execution by a virtual machine.

FIG. 1 describes the working of the virtual machine. The compiler 102 produces byte code 104 from source code 102. The virtual machine 106 consists of the byte code instruction processor (BCIP) 108, the memory 110 and the other modules 112. The BCIP 108 is where each individual byte-code instruction 104 is processed and actually executed. The execution of these instructions 104 can cause changes to the memory 110 and/or cause other modules 112 such as the thread scheduler or garbage collector to perform tasks. The memory 110 is where all the state information of the virtual machine 106 and the user program is stored. This memory 110 is accessed/updated by the BCIP 108 as well as by other modules 112 such as the garbage collector. The other modules 112 are necessary for correct functioning of the virtual machine. These typically include implementation for system level functions and may include garbage collection, thread scheduling, etc.

The virtual machine 106 commences execution at some specified instruction in the byte code 104 and continues executing until it reaches the end of the instruction sequence. Execution of instructions can cause information to be stored and retrieved from memory 110, as well as cause the execution of the other modules 112 of the virtual machine 106.

Figure 2:
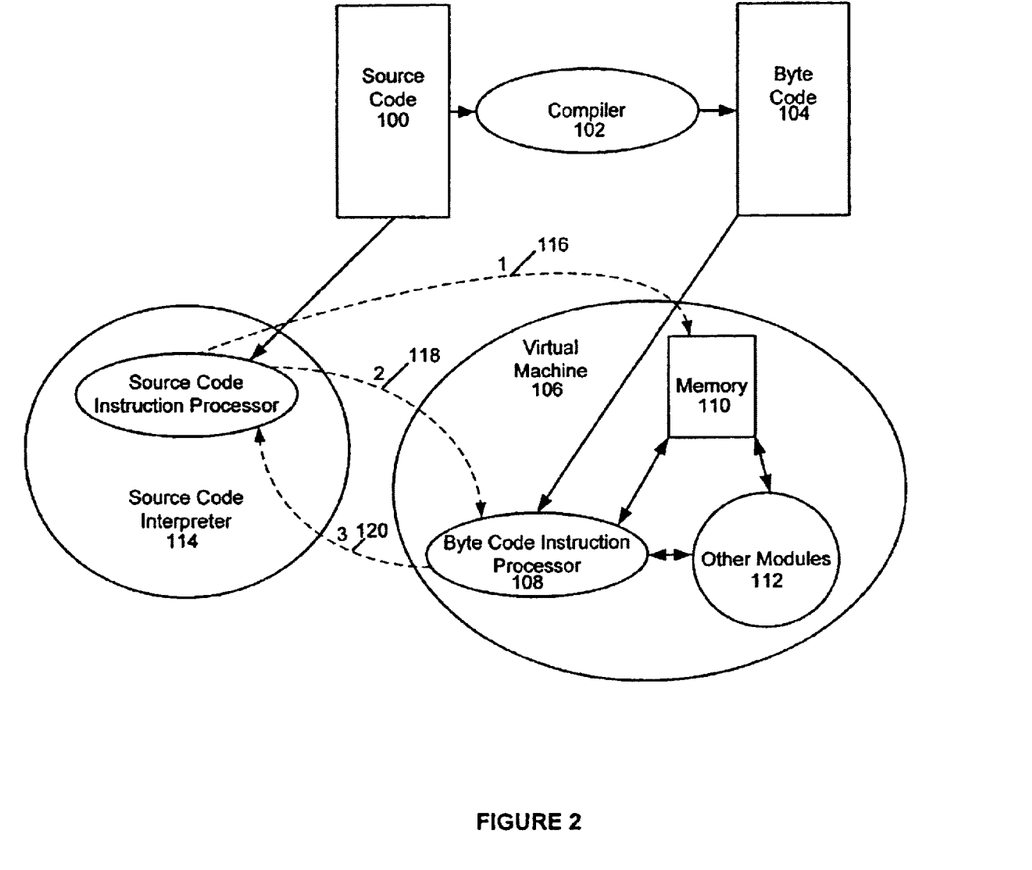
FIG. 2 illustrates the mixed-mode execution of a source code interpreter and a virtual machine of the present invention.

FIG. 2 illustrates the mixed-mode execution where the virtual machine and the source code interpreter operate together. FIG. 2 is identical to FIG. 1 except in that there is one additional module, the source code interpreter containing a single component—the source code instruction processor (SCIP) 114. This is similar to the BCIP 108, except that the SCIP 114 executes each individual source code 100 statement directly. The execution of these instructions can also cause changes to memory 110 (as in the case of the BCIP 108). The SCIP 114 uses the memory 110 in the virtual machine 106 since the information in memory 110 needs to be shared between the two modes of execution.

Execution in the mixed mode, environment proceeds as in the case of the virtual machine 106 in isolation. However, in this case, the BCIP 108 may from time to time decide to pass control to the SCIP 114 (for example, when it realizes that profiling information needs to be gathered for a particular portion of code). Similarly, when the SCIP 114 is executing, it may decide to transfer control back to the BCIP 108 (for example, code that was being profiled has been executed and now execution can proceed at full speed).

The interaction between the SCIP 114 and the virtual machine 106 can be categorized in three primary ways. One interaction 116 is access/update of memory 110 in the virtual machine 106 by the SCIP 114. The second interaction 118 is transferring control from the SCIP 114 to the virtual machine 106. The third interaction 120 is transferring control from the virtual machine 106 to the SCIP 114.

The presently preferred embodiment of the present invention includes schemes to handle each of these interactions.

In an interpreted environment for object-oriented languages, it is possible to add new classes to a running program—essentially growing the program dynamically. A class is an encapsulation that defines variables and methods. Variables are memory locations where values are stored, and methods are pieces of program text that can be executed. Classes are typically used by creating instantiations of themselves called objects—instantiations are performed through special class members called constructors.

When new classes are added to a running system, they can be compiled to invoke methods of classes that already exist in the program. They can also be defined as subclasses of existing classes. A subclass further defines a class (the superclass) possibly by adding more variables and methods. Objects of the subclass are also objects of the superclass. By designing the program properly, it is possible to add new classes to the running program as subclasses of existing classes, and then invocations of methods of these existing classes end up invoking methods in the newly added subclass (since the subclass methods are specializations of the superclass methods, they override the superclass methods).

This strategy allows the addition of new classes to the system allowing interactions between existing code and the newly added code in both directions.

Figure 3:
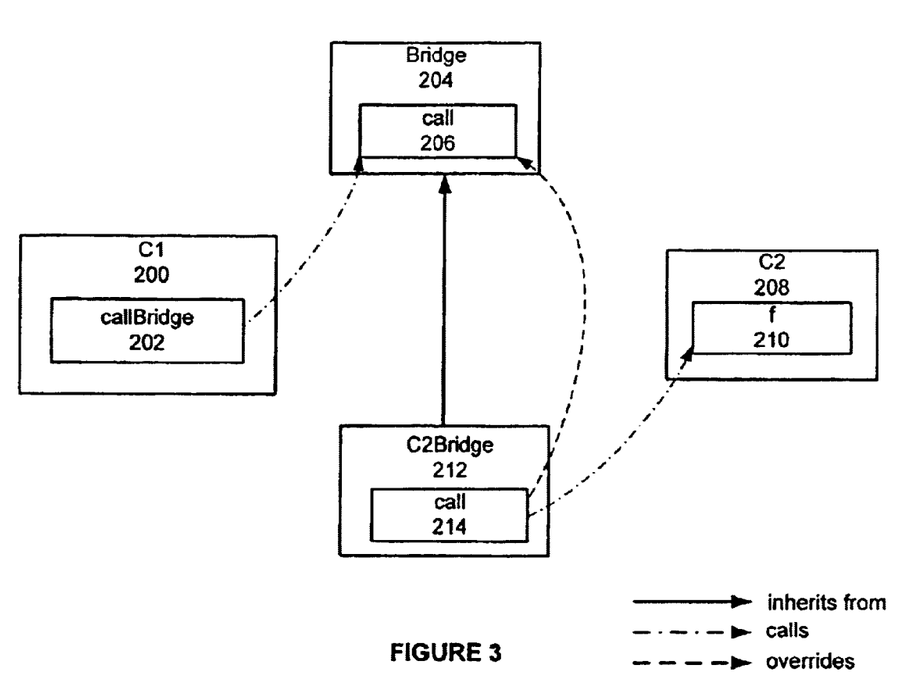
FIG. 3 illustrates an exemplary embodiment of adding a new class to an existing program and using it from existing code.

The following example in Java illustrates this strategy with the help of FIG. 3. Suppose a program contains the following class c1 200:

```
class C1 {
    ...
}
```

Now suppose a new class c2 208 is added to the program:

```
class C2 {
    static void f( ) { ... }
}
```

Code in class c2 208 can clearly make calls to code in c1 200 (given that c2 208 can be compiled with respect to c1 200). The more interesting case is where code in c1 200 makes calls to methods, or refers to variables in c2 208. This case is interesting because c1 200 has been compiled before c2 208 and therefore has no way of knowing how to refer to c2 208. To achieve the ability for c1 200 to refer to c2 208), the program is compiled with a special class Bridge 204:

```
abstract class Bridge {
    abstract void call( );
}
```

Whenever a new class (such as c2 208) is added to the program, a corresponding set of subclasses of Bridge 204 are also added to the program. These subclasses are created on the fly by inspecting the new class and inserting code into them to refer to the new class. When c2 208 is added to the program, the following subclass of Bridge (c2Bridge 212) is also added to the program:

```
class C2Bridge extends Bridge {
    void call( ) {
        C2.f( );
    }
}
```

Now c1 200 can call the method f 210 in c2 208—all it has to know is the name of the newly added class. The following code in c1 200, which is independent of the actual new class achieves the ability to call c2.f 210:

```
class C1 {
    ...
    static void callBridge(String newclass) {
        Bridge obj = (Bridge) (Class.forName(newclass +
```
-continued

```
"Bridge").newInstance( )};
        obj.call( );
    }
    ...
}
```

Essentially, existing code simply has to call c1.callBridge 202 ("c2") to invoke the newly added method c2.f 210.

This demonstrates the ability to add new classes to a running system and allow method invocation in both directions.

FIG. 3 illustrates the call from c1.callBridge 202 to c2Bridge.call 214 as going through Bridge.call 206. The call goes from c1 200 to Bridge 204 as a normal method call. Since call 206 is overridden in c2Bridge 212, the method 214 in c2Bridge 212 ends up being called. The call of c2.f 210 from c2Bridge.call 214 is possible because c2Bridge 212 is compiled after c2 208 is available.

In the embodiments of the innovations described later, this general scheme is used after customizing in some way. Part or all of the source code interpreter is written in the same language being interpreted—therefore this part of the source code interpreter is actually executed by the virtual machine. Hence the virtual machine is executing (some portion of) the source code interpreter as well as the byte code of the user's application. The source code interpreter is the first piece of code to exist and the user application code is added later. Hence, the source code interpreter corresponds closely to c1 200 in the above example, while the user application code corresponds to c2 208.

While the source code interpreter cannot directly access the byte code of the user application (and therefore has to resort to the strategy described above), it does have access to the source code of the user application as input data. Therefore it has all relevant information regarding the user application to facilitate the operations described later. The specific information needed is knowledge of all fields, methods, and constructors present in each class and their types, parameter profiles, etc.

To illustrate the details of the innovations described later, the following example in Java containing 2 constructors, 2 fields, and 2 methods is used throughout the remainder of this document:

```
class MyClass {
    MyClass( ) {
        ...
    }
    MyClass(int x) {
        ...
    }
    int i;
    char c;
    void f(int x) {
        ...
    }
    char g( ) {
        ...
    }
}
```

Details of this example have been left out since they are not necessary. The source code interpreter assigns an index to each of these entries for bookkeeping purposes. In the example used here, the following indices may be used

| | |
|---|---|
| Constructor MyClass ( ) | 1 |
| Constructor MyClass (int x) | 2 |
| field i | 3 |
| field c | 4 |
| method f (int x) | 5 |
| method g ( ) | 6 |

The method of bookkeeping is not important to the innovations described. Indexing using numbers has been selected as one possible scheme for bookkeeping. Any other scheme for bookkeeping can be used. By using numbers, the "bridge" code appearing later is able to use switch statements on these numbers—but if some other bookkeeping scheme is used, the switch statement strategy may have to be changed. It could change to a symbol table lookup, or it could even be done by having a separate bridge for each constructor, field, and method.

Accessing Virtual Machine Memory from the Source Code Interpreter

Object-oriented programs utilize two different kinds of memory:

Memory where objects (and their fields) are stored: This kind of memory contributes to the state of the system and persists across method calls. Typically, this kind of memory is stored in the heap.

Local variables of methods: This kind of memory is used as temporary storage during the execution of a method. As soon as the method execution completes, this memory is no longer used. Typically, this kind of memory is stored in the stack.

For the purpose of this section, only memory where objects are stored is considered. This is because local variable memory is so transient that other more specialized schemes can be used during transfer of control between the source code interpreter and the virtual machine. Issues related to local variable memory are therefore discussed later. In fact, memory 110 in FIG. 1 and FIG. 2 can be considered to refer to object storage memory only.

There are 3 operations performed on memory—object creation, field access, and field assignment.

Object Creation

Figure 4:
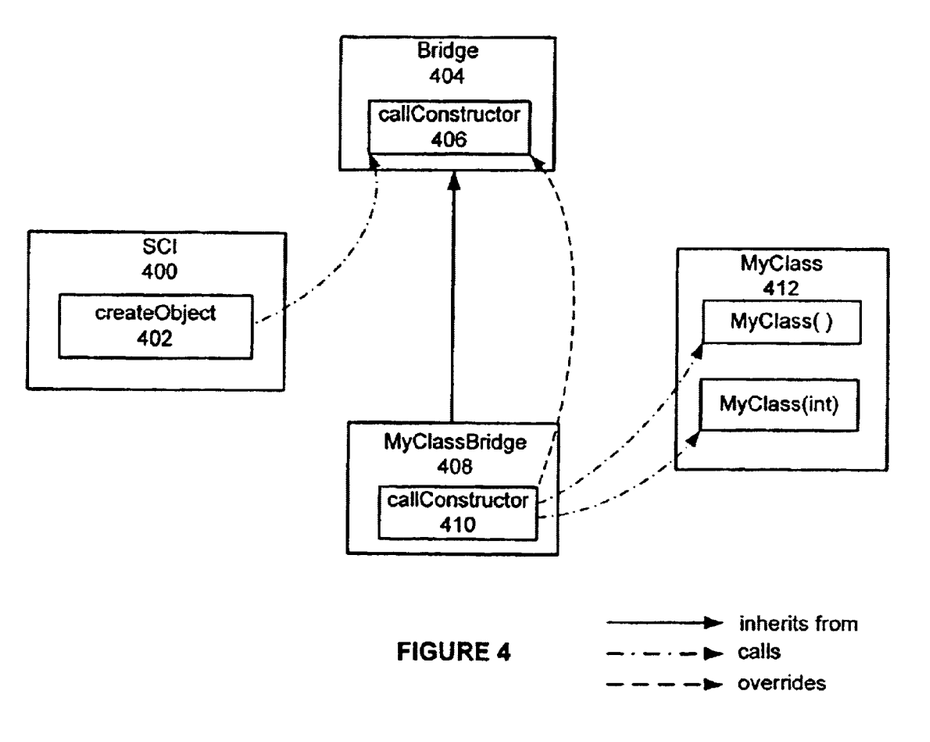
FIG. 4 illustrates an exemplary mechanism of creating virtual machine objects from the source code interpreter as described in the present invention.

When the source code interpreter needs to create a new object, it first loads the corresponding bridge object and invokes a method in the bridge object that in turn creates the new object. The strategy to do this follows the general strategy mentioned earlier. The example below in Java, together with FIG. 4, illustrates how this is done for the MyClass 412 constructors. Class Bridge 404 is extended to have a method callConstructor 406:

```
abstract class Bridge {
    abstract Object callConstructor(int index) throws Throwable;
}
```

The bridge class for MyClass 408 overrides callConstructor 406 as follows:

```
public static class MyClassBridge extends Bridge {
    public final Object callConstructor(int index) throws Throwable {
        switch (index) {
        case 1:
```

```
            return new MyClass( );
        case 2:
            return new MyClass(getIntRegister( ));
        }
    }
}
```

The important points to note about callConstructor 410 are that it returns the newly created object, that it takes as parameter the index of the constructor to invoke, and that it is declared to throw any possible exception (not relevant if the language does not support exceptions). Given that source code interpreter (SCI) 400 has knowledge of the constructors being called, it knows exactly what exceptions may be thrown and must handle them appropriately. The code getIntRgeister( ) is a fragment of code that retrieves the correct integer value from SCI 400's registers, or stack, or any other scheme it uses for storage. The word "register" is used from now onwards to denote whatever scheme SCI 400 uses for this purpose.

SCI can now create objects of class MyClass 412 as follows:

```
class SCI {
    ...
    static Object createObject(String classname, int index) throws
    Throwable
    {
        Bridge br = getBridgeObject(classname);
        return br.callConstructor(index);
    }
    ...
}
```

If the second constructor is being called (i.e., index is 2), then SCI 400 sets its registers with the integer parameter required by the constructor before it calls createObject 402. The code getBridaeObject (classname) obtains the bridge object corresponding to classname. There are many ways in which this can be done, and in fact, it is not necessary to get a new bridge object each time, rather a previously created bridge object can be reused. To create a bridge object before the first use, the Java code to be used looks like:

```
(Bridge)(Class.forName(classname + "Bridge").newInstance( ))
```

Since both the source code interpreter and the virtual machine use the same object space, there are no issues related to inheritance, garbage collection, threads, reflection, serialization, etc.—essentially any issues related to having to maintain consistency between objects manipulated by the source code interpreter and the virtual machine are alleviated.

Field Access

Figure 5:
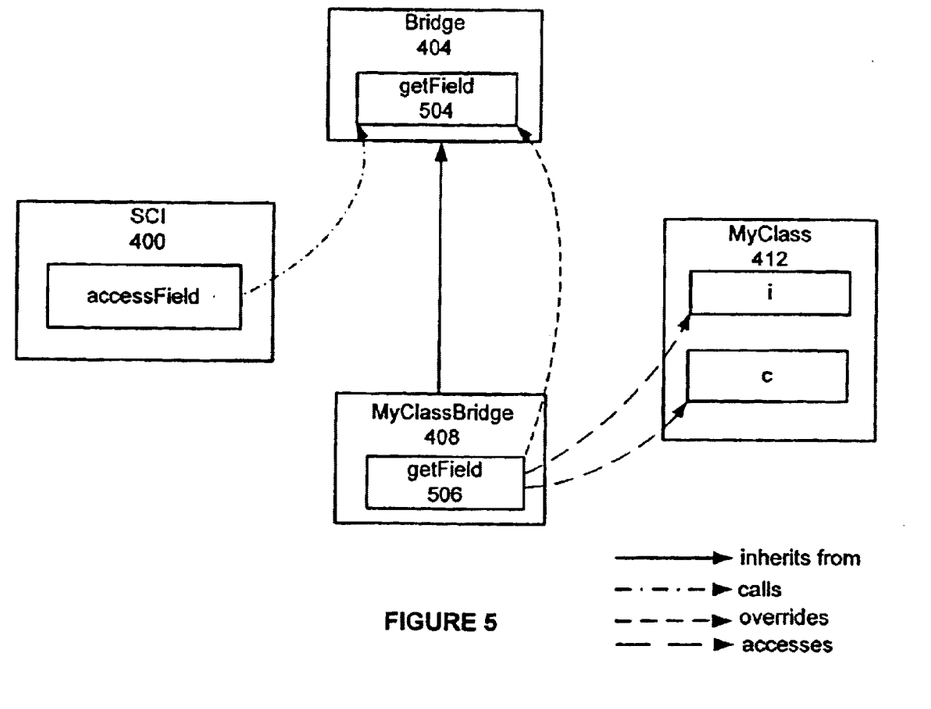
FIG. 5 illustrates an exemplary mechanism of accessing fields of virtual machine objects from the source code interpreter as described in the present invention.

When the source code interpreter needs to access the field of a virtual machine object, it first loads the corresponding bridge object and invokes a method in the bridge object which in turn accesses the field of the virtual machine object. The virtual machine object is assumed to have been created earlier as described previously. The example below in Java, along with FIG. 5, illustrates how this is done for the MyClass 412 fields. Class Bridge 404 is extended to have a method getField 504:

```
abstract class Bridge {
    abstract void getField(Object obj, int index);
}
```

The bridge class for MyClass 408 overrides getField 504 as follows:

```
public static class MyClassBridge extends Bridge {
    public void getField(Object obj, int index) {
        switch (index) {
            case 3:
                setIntRegister(((MyClass)obj).i);
                break;
            case 4:
                setCharRegister(((MyClass)obj).c);
                break;
        }
    }
}
```

The important points to note about getField 506 are that it takes as parameter the object whose field needs to be accessed and the index of the field to access, and that the code setIntRegister( . . . ) and setCharRegister( . . . ) are fragments of code that assigns their argument to the corresponding interpreter register.

SCI 400 accesses fields of virtual machine objects by calling getField 504 on the object and then accessing the register into which the field value has been placed:

```
class SCI {
    ...
    static Object accessField(String classname, Object obj, int index) {
        Bridge br = getBridgeObject(classname);
        br.getField(obj, index);
        // At this point, the register contains the field value.
    }
    ...
}
```

Field Assignment

Figure 6:
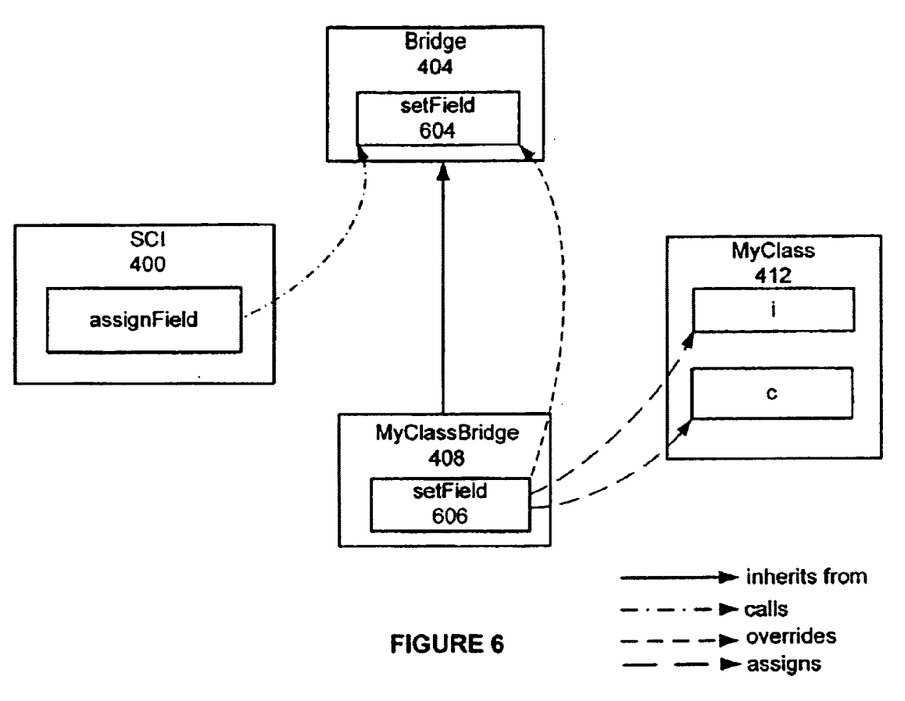
FIG. 6 illustrates an exemplary mechanism of assigning fields of virtual machine objects from the source code interpreter as described in the present invention.

Field assignment is performed in a manner quite similar to field access. SCI 400 first sets the appropriate register with the value to be assigned and then calls the bridge object to perform the assignment. The example below in Java, along with FIG. 6, illustrates how this is done for the MyClass 412 fields. Class Bridge 404 is extended to have a method setField 604:

```
abstract class Bridge {
    abstract void setField(Object obj, int index);
}
```

The bridge class for MyClass 408 overrides setField 604 as follows:

```
public static class MyClassBridge extends Bridge {
    public void setField(Object obj, int index) {
        switch (index) {
            case 3:
```

```
                ((MyClass)obj).i = getIntRegister( );
                break;
            case 4:
                ((MyClass)obj).c = getCharRegister( );
                break;
        }
    }
}
```

SCI 400 assigns fields of virtual machine objects by saving the value to be assigned into the appropriate register and then calling setField 604 on the object:

```
class SCI {
    ...
    static Object assignField(String classname, Object obj, int index) {
        // At this point, the register contains the value to be assigned.
        Bridge br = getBridgeObject(classname);
        br.setField(obj, index);
    }
    ...
}
```

Transferring Control from the Source Code Interpreter to the Virtual Machine

While the source code interpreter is executing the source code of the user application, there may be points at which it may decide to transfer control to the virtual machine to continue execution. The more straightforward case is when the transfer of control takes place at method boundaries. That is, when the source code interpreter is about to interpret a method call, it makes a decision to transfer control to the virtual machine to execute the method. Then the virtual machine executes the method and transfers control back to the source code interpreter at the end of the method. Given that all memory (other than local variables) is stored by the virtual machine as described earlier, and given that there are no local variables that need to be shared between the source code interpreter and virtual machine, the scheme to transfer control to the virtual machine is quite similar to the earlier schemes already described. However, when the source code interpreter needs to transfer control to the virtual machine after partially executing a method so that the virtual machine can complete the execution of this method, the process is a bit more involved since local variables need to be transferred from the source code interpreter to the virtual machine.

Figure 7:
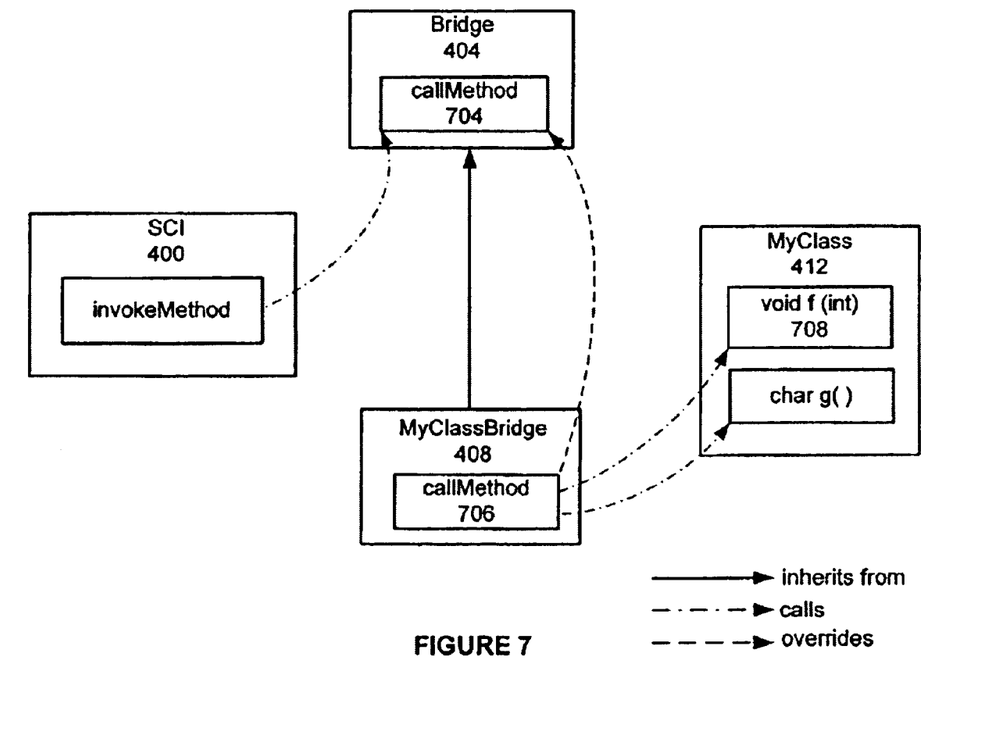
FIG. 7 illustrates an exemplary mechanism of transferring control to the virtual machine from the source code interpreter at method boundaries.

The first scheme described shows how transfer of control can be achieved at method boundaries. When the source code interpreter has reached a method call and decides to transfer control to the virtual machine to execute the method, it first loads the corresponding bridge object and invokes a method in the bridge object which in turn calls the method to be executed. The strategy to do this follows the general strategy mentioned earlier. The example below in Java, together with FIG. 7, illustrates how this is done for the MyClass 412 methods. Class Bridge 404 is extended to have a method callMethod 704:

```
abstract class Bridge {
    abstract void callMethod(Object obj, int index) throws Throwable;
}
```

The bridge class for MyClass 408 overrides callMethod 704 as follows:

```
public static class MyClassBridge extends Bridge {
    public void callMethod(Object obj, int index) throws Throwable {
        switch (index) {
        case 5:
            ((MyClass)obj).f(getIntRegister( ));
            break;
        case 6:
            setCharRegister(((MyClass)obj).g( ));
            break;
        }
    }
}
```

The important points to note about callMethod 706 are:

It takes as parameter the object whose method is to be invoked and the index of the method to invoke.

It is declared to throw any possible exception (not relevant if the language does not support exceptions). Given SCI 400's knowledge of the methods being called, it knows exactly what exceptions may be thrown and must handle them appropriately.

The parameters required for the method call are saved into registers by SCI 400 before it calls callMethod 704.

The return value of the method (if any) are saved into registers by callMethod 706. SCI 400 can then access this value.

SCI 400 can now call methods of class MyClass 412 as follows:

```
class SCI {
    ...
    static Object invokeMethod(String classname, Object obj, int index)
        throws Throwable
    {
        Bridge br = getBridgeObject(classname);
        return br.callMethod(obj, index);
    }
    ...
}
```

Transferring control after partially executing a method is now described. This requires:

A special compilation of the source code of the user application into byte code. This is achieved by replacing the compiler 102 in FIG. 1 and FIG. 2 by a compiler that can perform this special compilation Predetermination of all the points in the source code where control may be transferred from the source code interpreter to the virtual machine. This predetermination must be made before the special compilation is performed.

The special compilation of the source code of the user application creates new methods in the byte code that is passed all the parameters of the original method as well as all the local variables. There is a new method corresponding to each predetermined point where control can be transferred and the method's behavior is to simply execute from this point (alternatively, a single method with an extra parameter to control its behavior will also work).

Figure 8:
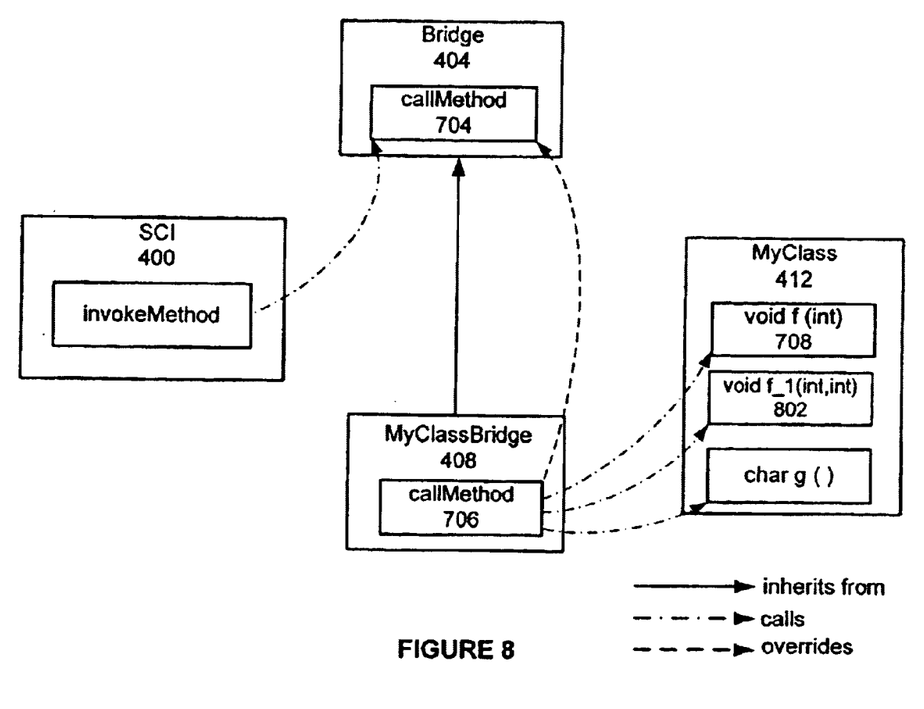
FIG. 8 illustrates an exemplary mechanism of transferring control to the virtual machine from the source code interpreter at arbitrary locations.

This is illustrated in FIG. 8 by defining a sample implementation of the method f 708 in the lava example above as follows:

```
class MyClass {
```

-continued

```
    void f(int x) {
        int j = 1;
        while (j < x) {
            j = j + x;
        }
        i = j - x;
    }
}
```

Suppose it is predetermined that SCI 400 may transfer control to the virtual machine after executing the loop (Oust before the final statement i=j−x;) of the method. Then the special compilation of MyClass 412 generates byte code equivalent to:

```
class MyClass {
    void f(int x) {
        int j = 1;
        while (j < x) {
            j = j + x;
        }
        i = j - x;
    }
    void f_1(int x, int j) {
        i = j - x;
    }
}
```

If SCI 400 decides to transfer control to the virtual machine after executing the loop in f 708, it simply calls the new method f_1 802 and passes it the current value of the parameter x, as well as the current values of all the local variables (only j in this case). The actual calling scheme is otherwise identical to the previous case (where control was transferred at method boundaries). The new method f_1 802 requires an index—suppose it is assigned 51—and the bridge class for MyClass 408 needs to be extended to call this method:

```
public static class MyClassBridge extends Bridge {
    public void callMethod(Object obj, int index) throws Throwable {
        switch (index) {
        case 5:
            ((MyClass)obj).f(getIntRegister( ));
            break;
        case 51:
            ((MyClass)obj).f_1(getIntRegister( ), getSecondIntRegister( ));
            break;
        case 6:
            setCharRegister(((MyClass)obj).g( ));
            break;
        }
    }
}
```

Transferring Control from the Virtual Machine to the Source Code Interpreter

The scheme to transfer control from the virtual machine to the source code interpreter does not follow the general strategy mentioned above. This is because this scheme is achieved by applying a special compiler on the user application that causes the transfer of control at predetermined locations in the program. Since this compilation takes place after the source code interpreter code is available, the compiler can generate byte code that directly refers to the source code interpreter code without requiring a bridge. For this scheme too, it is necessary to predetermine the points at which control may transfer from the virtual machine to the source code interpreter. Consider the same example used earlier with the possibility of control being transferred from the virtual machine to the source code interpreter at the beginning of the method as well as at the end of the loop, just before the final statement (i=j-x;) of the method:

```
class MyClass {
    void f(int x) {
        int j = 1;
        while (j < x) {
            j = j + x;
        }
        i = j - x;
    }
}
```

This example is translated by the special compiler as follows:

```
class MyClass {
    void f(int x) {
        if (transferControlToSCI()) {
            executeSCIInstr(firstf, x) and
                catchAnyThrownExceptionAndCastBeforeRethrowing();
            return;
        }
        int j = 1;
        while (j < x) {
            j = j + x;
        }
        if (transferControlToSCI()) {
            executeSCIInstr(laststmf, x, j) and
                catchAnyThrownExceptionAndCastBeforeRethrowing();
            return;
        }
        i = j - x;
    }
}
```

The important points to note about this translated version are:

The check transferControlToSCI( ) may be any check to determine whether or not control should be transferred to the source code interpreter at this point.

The statement executeSCIInstr(firstf. x) calls the source code interpreter with the instruction corresponding to the first instruction of method f as a parameter (so that interpretation can continue from this location). The parameter x is also passed to the source code interpreter.

The statement executeSCIInstr(laststmf. x. j) does a similar action to that described in the previous point. It calls the source code interpreter with the instruction corresponding to the statement (i=j-x) and passes the parameter x and the local variable j.

The statement catchAnyThrownExceptionAndCastBeforeRethrowing( ) is a catch-all exception handler to catch any exceptions generated as a result of calling the source code interpreter. If the source code interpreter determines that the method it is interpreting needs to throw an exception out of the method, the exception is thrown as a real exception that can then be passed on to the virtual machine. This statement then casts the exception to the actual exception generated and re-throws it to cause the proper behavior in the virtual machine execution. This statement is only relevant if the language supports exceptions.

Figure 9:
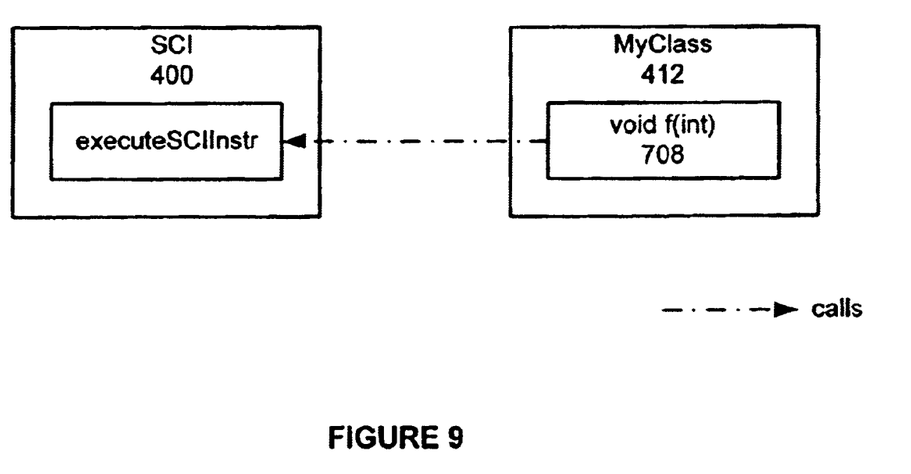
FIG. 9 illustrates transferring control to the source code interpreter from the virtual machine.

FIG. 9 illustrates the scheme for transferring control to SCI 400 from the virtual machine.

Figure 10:
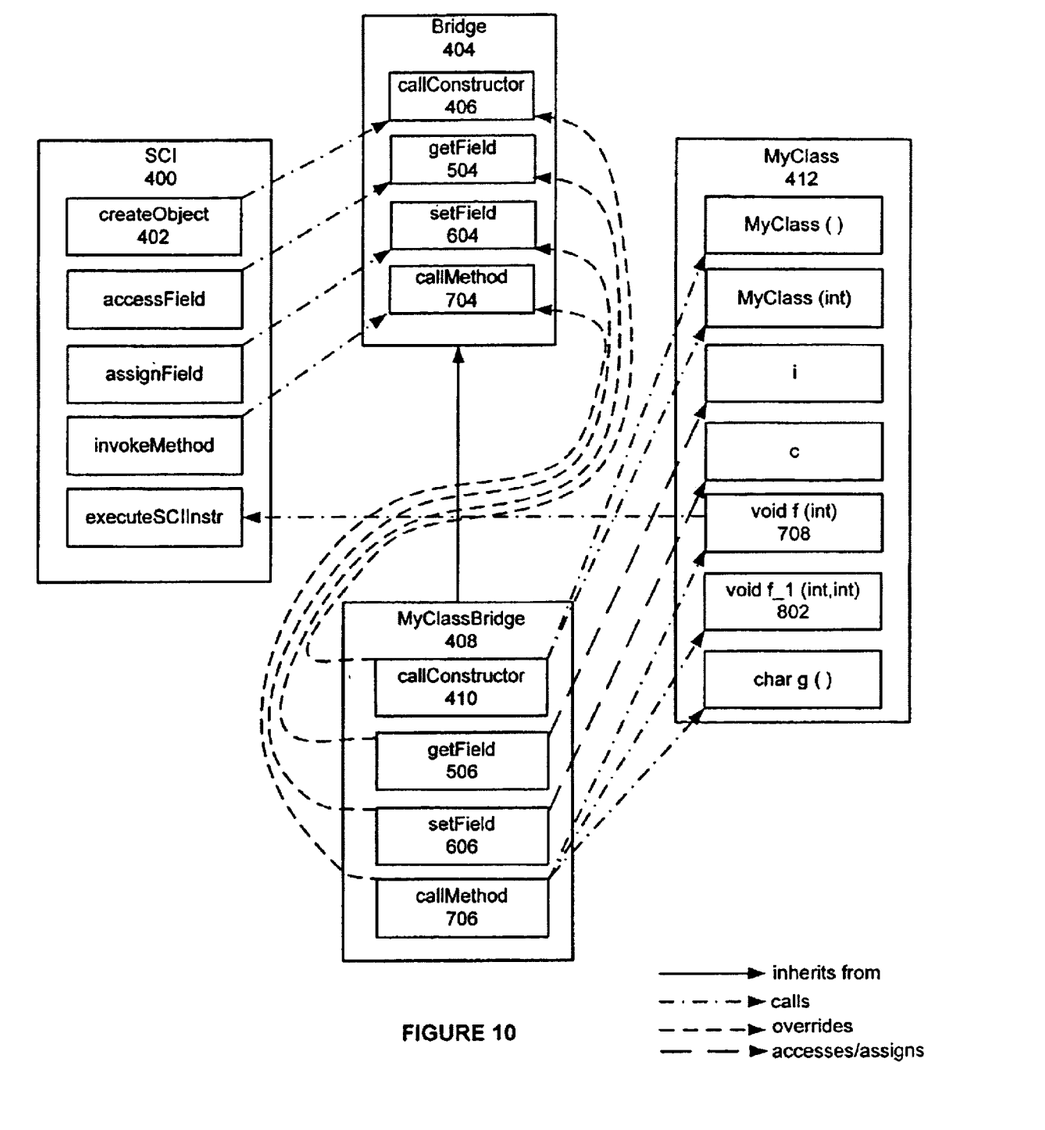
FIG. 10 illustrates an exemplary embodiment of the various interactions between a source code interpreter and a virtual machine.

The bits and pieces of the example presented earlier are now combined into a complete system below, as illustrated in FIG. 10. The complete Bridge class 404 follows:

```
abstract class Bridge {
    abstract Object callConstructor(int index) throws Throwable;
    abstract void getField(Object obj, int index);
    abstract void setField(Object obj, int index);
    abstract void callMethod(Object obj, int index) throws Throwable;
}
```

The complete MyClassBridge class 408 follows:

```
public static class MyClassBridge extends Bridge {
    public final Object callConstructor(int index) throws Throwable {
        switch (index) {
            case 1:
                return new MyClass();
            case 2:
                return new MyClass(getIntRegister());
        }
    }
    public void getField(Object obj, int index) {
        switch (index) {
            case 3:
                setIntRegister(((MyClass)obj).i);
                break;
            case 4:
                setCharRegister(((MyClass)obj).c);
                break;
        }
    }
    public void setField(Object obj, int index) {
        switch (index) {
            case 3:
                ((MyClass)obj).i = getIntRegister();
                break;
            case 4:
                ((MyClass)obj).c = getCharRegister();
                break;
        }
    }
    public void callMethod(Object obj, int index) throws Throwable {
        switch (index) {
            case 5:
                ((MyClass)obj).f(getIntRegister());
                break;
            case 51:
                ((MyClass)obj).f_1(getIntRegister(), getSecondIntRegister());
                break;
            case 6:
                setCharRegister(((MyClass)obj).g());
                break;
        }
    }
}
```

The compiled version of MyClass 412 is equivalent to the Java source shown below:

```
class MyClass {
    MyClass() {
        ...
    }
    MyClass(int x) {
        ...
    }
    int i;
    char c;
    void f(int x) {
        if (transferControlToSCI()) {
            executeSCIInstr(firstf, x) and
```

-continued

```
        catchAnyThrownExceptionAndCastBeforeRethrowing( );
      return;
    }
    int j = 1;
    while (j < x) {
      j = j + x;
    }
    if (transferControlToSCI( )) {
      executeSCIInstr(laststmf, x, j) and
        catchAnyThrownExceptionAndCastBeforeRethrowing( );
      return;
    }
    i = j - x;
  }
  void f_1(int x, int j) {
    i = j - x;
  }
  char g( ) {
    ...
  }
}
```

While the exemplary embodiments of the innovations described consider mixed-mode execution between a source code interpreter and a virtual machine, all the innovations described will work in any situation involving mixed-mode execution of object-oriented programs, so long as the "higher level" mode of execution (e.g. the source code interpreter) has some components that are being executed by the "lower level" mode of execution (e.g. the virtual machine), and it is possible to add new classes to a running program at the lower level mode of execution. Another exemplary embodiment of the invention is a C++ environment where C++ programs are executed natively and also interpreted using a source code interpreter written in C++.

What is claimed is:

1. An apparatus enabling mixed-mode execution of a subject computer program in an object-oriented programming environment, the subject computer program comprising a set of source code instructions and a set of byte code instructions compiled from the source code instructions, comprising a source code instruction processor (SCIP) operable to execute source code instructions;

a bridge class enabling addition of new classes to the SCIP;

a memory storing state information for the SCIP and the subject computer program;

a byte code instruction processor (BCIP) operable to execute byte code instructions and retrieve, store, and/or modify data stored in the memory;

wherein the BCIP is operable to execute the SCIP and the subject computer program;

wherein the SCIP is operable to identify class members in the source code instructions of the subject computer program; wherein the SCIP is operable to extend the bridge class with methods allowing access to identified class members; and wherein the SCIP is operable to interpret a source code instruction and invoke methods in an instantiation of the bridge class to access required class or object attributes.

2. The apparatus of claim 1 wherein the SCIP is operable to transfer execution of the subject computer program to the BCIP; and wherein the BCIP is operable to transfer execution of the subject computer program to the SCIP.

3. The apparatus of claim 1 wherein the SCIP is operable to profile the source code and associate an index value to each class member.

4. The apparatus of claim 3 wherein the SCIP is operable to extend the bridge class with methods calling to each class member.

5. The apparatus of claim 4 wherein the index value of each class member is associated with the corresponding method in the bridge class.

6. The apparatus of claim 5 wherein the methods in the bridge class are callable with reference to the associated index value.

7. The apparatus of claim 3 wherein the SCIP is operable to inspect the source code and, as to each class in the source code, index all necessary fields, methods and constructors.

8. The apparatus of claim 7 wherein the SCIP is operable to extend the bridge class with methods calling to the fields, methods, and constructors of each class.

9. The apparatus of claim 1 wherein the byte code instruction processor is a virtual machine, and wherein the memory is a component of the virtual machine.

10. The apparatus of claim 9 wherein the virtual machine further comprises a memory management component, a thread scheduling component, and a thread synchronization component; and wherein the virtual machine is operative to execute byte code instructions to cause the memory management component, thread scheduling component or the thread synchronization component to perform tasks associated with data stored in the memory.

11. The apparatus of claim 1 wherein the SCIP transfers execution of the subject computer program to the BCIP by invoking a method in an instantiation of the bridge class, wherein the method is operative to invoke a corresponding method in the subject computer program.

12. The apparatus of claim 1 wherein the subject computer program includes a control transfer method inserted within a method associated with the subject computer program;

wherein the bridge class is extended to include a method calling to the control transfer method; and wherein the SCIP is operative to transfer execution of the subject computer program to the BCIP upon execution of the control transfer method.

13. The apparatus of claim 1 wherein the byte code corresponding to the subject computer program includes at least one call to the SCIP; and wherein the BCIP is operative to execute the call to the SCIP and transfer execution of the subject computer program to the SCIP.

14. The apparatus of claim 13 wherein the BCIP is operative to transfer the instruction associated with the call and any necessary parameters to the SCIP.

15. A method allowing for mixed-mode execution of a subject computer program in an object-oriented programming environment, the method comprising the steps of profiling the source code instructions of a subject computer program to identify the class members in the computer program, wherein the subject computer program includes source code instructions and byte code instructions compiled from the source code instructions, wherein a source code instruction processor (SCIP) is operable to execute source code instructions of the subject computer program, the SCIP including an extendable bridge class allowing for the addition of new classes to the SCIP, and wherein a byte code instruction processor (BCIP) is operable to execute the SCIP and the subject computer program; and, extending the bridge class with methods allowing access to the class members.

16. The method of claim 15 wherein the profiling step comprises the steps of associating an index value to each class member.

17. The method of claim 16 wherein each index value comprises a letter.

18. The method of claim 16 wherein each index value comprises a number.

19. The method of claim 16 wherein each index value comprises a symbol.

20. The method of claim 16 wherein the methods extending the bridge class are callable by reference to the respective index values.

21. The method of claim 15, further comprising the steps of interpreting a source code statement;

executing the source code statement by accessing required class members through invocation of corresponding extending methods in the bridge class.

22. The method of claim 16, further comprising the steps of interpreting a source code statement;

executing the source code statement by accessing required class members through invocation of corresponding extending methods in the bridge class.

23. A method allowing for mixed-mode execution of a computer program by a source code instruction processor (SCIP) and a byte code instruction processor (BCIP), the method comprising the steps of determining at least one transfer point in the source code of a first method in a subject computer program where control of execution of the first method is operable to be transferred from the SCIP to the BCIP; wherein a bridge class allows for addition of classes to the SCIP and includes a method calling to the first method in the subject computer program; wherein the subject computer program includes source code instructions and byte code instructions compiled from the source code instructions, wherein the SCIP is operable to execute source code instructions of the subject computer program, the SCIP including an extendable bridge class allowing for the addition of new classes to the SCIP, and wherein the BCIP is operable to execute the SCIP and the subject computer program;

inserting, during compilation of the source code of the subject computer program, a control transfer method, wherein the transfer method is operable to execute the first method from the corresponding transfer point; and extending the bridge class with a method calling to the control transfer method.

24. The method of claim 23 wherein the control transfer method is inserted at the corresponding transfer point.

25. A method allowing for mixed-mode execution of a computer program by a source code instruction processor (SCIP) and a byte code instruction processor (BCIP), the method comprising the steps of determining at least one transfer point in the source code of a first method where control of execution of the first method is operable to be transferred from the BCIP to the SCIP, the SCIP including an extendable bridge class allowing for the transfer of control of execution;

wherein the subject computer program includes source code instructions and byte code instructions compiled from the source code instructions, wherein the SCIP is operable to execute source code instructions of the subject computer program, the SCIP including an extendable bridge class allowing for the addition of new classes to the SCIP, and wherein the BCIP is operable to execute the SCIP and the subject computer program;

inserting, during compilation of the source code, a call to the SCIP at each transfer point; wherein the call is operable to pass execution of the first method from the BCIP to the SCIP.

26. The method of claim 25 wherein the call passes the instruction associated with the transfer point and any necessary parameters to the SCIP.

27. The method of claim 25 wherein the call is conditioned on a process operative to determine whether control should be transferred.

28. A method allowing for mixed-mode execution of a computer program in an object-oriented programming environment, the computer program including source code instructions and byte code instructions compiled from the source code instructions, wherein a source code instruction processor (SCIP) is operable to execute source code instructions, wherein the SCIP includes a bridge class allowing for the addition of new classes, and wherein a byte code instruction processor (BCIP) is operable to execute byte code instructions, the method comprising the steps of profiling the source code instructions to identify the attributes of each class in the computer program;

extending the bridge class to refer to the attributes of each class;

determining at least one transfer point in the source code of a first class where control of execution of the first class is operable to be transferred from the BCIP to the SCIP; and inserting, during compilation of the source code instructions into byte code instructions, control transfer calls to the SCIP at each transfer point;

wherein each control transfer is operable to transfer execution of the computer program from the BCIP to the SCIP.

29. The method of claim 28 wherein each control transfer call passes the instruction associated with the transfer point and any necessary parameters.

30. The method of claim 28 further comprising the steps of determining at least one transfer point in the source code of a first method where control of execution of the first method may be transferred from the SCIP to the BCIP;

inserting, during compilation of the source code, a control transfer method, wherein the transfer method is operable to execute the first method from the corresponding transfer point; and extending the bridge class with a method calling to the control transfer method.

31. The method of claim 30 wherein the control transfer method is inserted at the corresponding transfer point.

* * * * *